Feb. 13, 1962  S. R. THORNTON  3,021,178
LOCKING DEVICE FOR VEHICLE HUB CAPS
Filed April 5, 1960
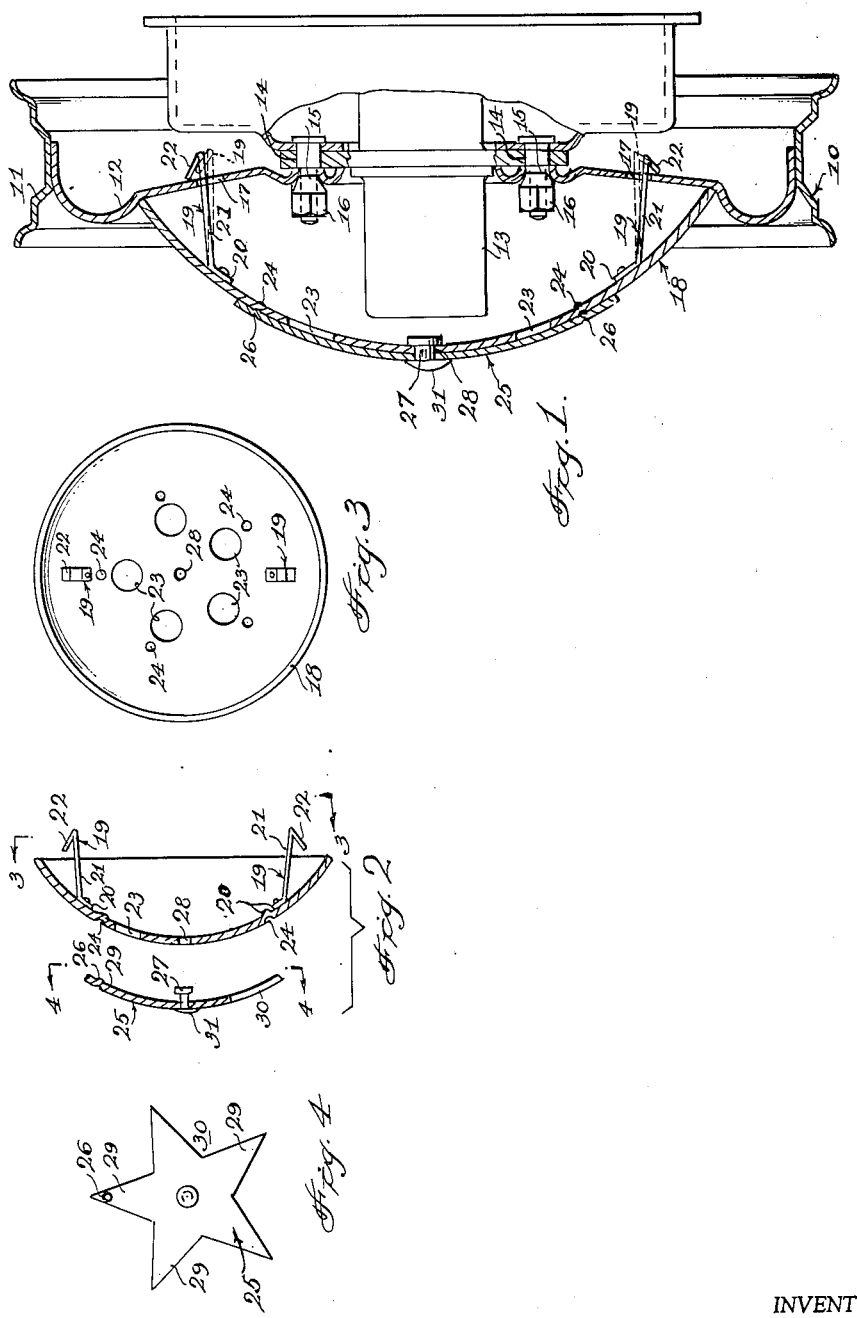
INVENTOR.
STUART R. THORNTON
BY
Victor J Evans +Co.
ATTORNEYS United States Patent Office 3,021,178
Patented Feb. 13, 1962

3,021,178
LOCKING DEVICE FOR VEHICLE HUB CAPS
Stuart R. Thornton, 3700 26th St., San Francisco, Calif.
Filed Apr. 5, 1960, Ser. No. 20,040
4 Claims. (Cl. 301—37)

This invention relates to a vehicle wheel, and more particularly to a locking device for a vehicle wheel hub cap.

The object of the invention is to provide a locking mechanism which w ll prevent theft or unauthorized removal of the hub caps from vehicle wheels.

Another object of the invention is to provide unauthorized or wrongful or accidental loss of a vehicle hub cap from the vehicle wheel, and wherein the locking device of the present invention is constructed so that in order to remove the hub cap, it is necessary to remove the vehicle wheel whereby accidental loss or theft of vehicle hub caps will be minimized or prevented.

A further object of the invention is to provide a locking device for vehicle hub caps which is extremely simple and inexpens've to manufacture.

Other objects and advantages will be apparent during the course of the following description.

In the accompanying drawing, forming a part of this application, and in which l ke numerals are used to designate like parts throughout the same:

FIGURE 1 is a sectional view taken through a vehicle wheel and illustrating the hub cap locking device of the present invention.

FIGURE 2 is a sectional view taken through the hub cap and cover member, and show.ng these members separated.

FIGURE 3 is a view illustrating the hub cap and taken generally on the line 3—3 of FIGURE 2.

FIGURE 4 is a view illustrating the cover member or outer plate and taken generally on the line 4—4 of FIGURE 2.

Referring in detail to the drawing, and more particularly to FIGURE 1 of the drawing, the numeral 10 indicates a portion of a convent onal vehicle wheel which includes the usual rim 11 as well as a main body portion 12 and the numeral 13 indicates the hub of the wheel. The main body portion 12 of the wheel is provided with openings 14 for the projection therethrough of studs 15, and securing elements or nuts 16 are arranged in threaded engagement with the studs 15. The portion 12 is also provided with a plurality of spaced apart openings 17, for a purpose to be later described.

The numeral 18 indicates a hub cap which is of arcuate or curved formation, and the hub cap 18 has secured thereto a plurality of spaced apart spring arms or lugs 19, and each of the lugs 19 includes an offset end portion 20 which is secured in any suitable manner to the hub cap 18. Each lug 19 further includes a main straight section 21 which terminates in an angularly disposed finger 22, and the fingers 22 are adapted to engage the inner surface of the portion 12 so that with the parts in the solid line position of FIGURE 1, wrongful or accidental disengagement of the hub cap 18 from the wheel is prevented. The lugs 19 are adapted to be made of a suitable material such as spr'ng metal which is slightly resilient so that when desired these lugs 19 can be manually moved inwardly as for example from the solid line position shown in FIGURE 1 to the dotted line position shown in FIGURE 1 in order to permit the fingers 22 to clear the port'on 12 whereby the hub cap 18 can then be removed. The lugs 21 extend through the openings 17 in the portion 12.

The hub cap 18 is provided with a plurality of spaced apart holes or openings 23 which are arranged in alignment with the studs 15 so that as later described in this application, a suitable tool such as a wrench can be inserted through these holes 23 in order to remove or tighten the nut 16 on the stud 15. The hub cap 18 is also provided with a plurality of spaced apart indentations or recessed pockets 24; the numeral 25 indicates an outer plate or cover member which is adapted to be arranged contiguous to the outer surface of the hub cap 18, and the cover member 25 may have a fanciful or attractive configuration, as for example it may be shaped to resemble a five pointed star. The cover member 25 is prov.ded with at least one protrusion or pressed out pin portion 26 for engaging an indentation 24 so as to help prevent accidental shifting or rotation of the cover member 25.

There is further provided a guide member or pivot pin member 27 which is arranged in such a manner as to extend through the central portion of the cover 25, and the p'n 27 also extends through a central opening 28 in the hub cap 18.

From the foregoing, it is apparent that there has been provided a locking device for vehicle hub caps which is especially suitable for use in preventing theft or unauthorized removal of the hub caps from vehicle wheels. In add tion, the locking device of the present invention will help prevent the hub caps from accidentally coming loose as for example when the vehicle is being driven along a highway or the like.

According to the present invention, it will be seen that the portion 12 of the wheel is provided with the openings 17, and the hub cap 18 has the spr'ng lugs or arms 19 secured thereto in any suitable manner. These lugs 19 extend through the openings 17 in the portion 12 of the wheel, and due to the inherent resiliency of the lugs 19, and due to the arrangement of these parts, the fingers 22 will engage behind the portion 12 so as to maintain the hub cap 18 secured to the portion 12. The cover 25 is arranged over the hub cap 18, and the pin members 27 connects the cover 25 to the hub cap 18, as shown in the drawings.

It w ll therefore be seen that with the parts arranged as shown in FIGURE 1 for example the hub cap 18 cannot be readily stolen or disengaged from the wheel due to the finger portions 22 which catch or engage behind the portion 12 of the wheel.

To remove the hub cap, it is first necessary to rotate the cover 25 on the pin 27, and the cover 25 can be rotated by simply prying a corner portion 29 of the cover 25 away from the hub cap 18 so that the pin or protrusion 26 will move out of engagement with an indentation 24, and then the cover 25 can be rotated so that the po nted portions 29 of the cover will uncover the holes 23 and whereby the spaces 30 which are defined between the corner portions 29, will be arranged in alignment with the holes 23 so that a conventional tool such as a lug wrench can be inserted through the openings 23. This tool can then be arranged in engagement with nuts or securing elements 16 whereby these securing elements 16 are unscrewed from the studs 15 and then the wheel 10 is removed from its shaft or hub 13, and with the wheel 10 removed, the spring lugs 19 can be manually pushed inwardly so as to perm't the fingers 22 to clear the portions 12 of the wheel whereby the hub cap 18 can then be disengaged or removed from the portion 12 of the wheel. Thus, theft of the hub caps will be prevented or minimized and hub caps can only be removed by removing the entire wheel and this will tend to discourage the theft of the hub caps.

The pin 26 on the cover 25 is adapted to engage one of the indentations 24 in the hub cap so as to provide gu'ding means which help align the cover on the hub cap, and normally the holes 23 are covered over by the pointed end portions 29 of the cover 25 so that unauthorized persons will not be aware of the presence of these holes in order to prevent unauthorized personnel from tampering with the wheel, and in addition by having the holes 23 covered over by the portions 29, the attractive appearance of the assembly will not be interfered with or detracted from. However, when the wheel is to be worked on, the inherent resiliency of the pointed portions 29 of the cover 25, permit the pointed portions to be readily pried or moved outwardly from the hub cap so as to permit the projection or pin to be moved away from its particular recess 24 so that the cover 25 can be rotated on the pin 27 in order to bring the spaces 30 into registry or alignment with the holes 23 so that the wrench can be used for moving the nuts 16 as previously stated.

The parts can be made of any suitable material and in different shapes or sizes.

As shown in the drawing, and in particular FIGURE 1, the fingers 22 face outwardly and this arrangement serves to insure that centrifugal force will hold the lugs 19 firmly to the wheel. The lugs 19 are made of a suitable resilient material so that the end portions 22 must be compressed or moved inwardly in order to withdraw the hub cap from the wheel.

Thus, it will be seen that there has been provided a hub cap locking means wherein the hub cap cannot be removed from the wheel without first raising the wheel from the ground and removing the entire wheel from the vehicle such as the automobile. The portions 20 of the lugs 19 may be secured to the hub cap 18 in any suitable manner, as for example by means of rivets, welding or the like. The openings 23 are aligned with the studs 15 and a wrench can be inserted through these openings 23 in order to unscrew the nuts 16. When the hub cap is to be removed as for example by authorized personnel, a portion of the automobile is first raised off of the ground and the wheel is then removed from the vehicle so that access can then be readily gained to the portions 22 of the locking lugs 19 whereby the lugs 19 can be sprung inwardly in order to permit ready and convenient removal of the hub cap 18 from the wheel so that it will be seen that the hub cap cannot be removed from the wheel without first taking the wheel off the vehicle. The wheel may be replaced on the vehicle without first putting the hub cap on the wheel since the hub cap can be forced against the wheel when the springlugs 19 are aligned with the openings 17, due to the inclined position of the fingers 22. The cover 25 which is adapted to be made highly ornamental or fanciful serves to cover up the openings 23 in the hub cap, when the parts are in the assembled position, as for example as shown in FIGURE 1.

As a modification, the inner end portions of the locking lugs 19 may be provided with cotter keys, or bolts and nuts can be used for further preventing removal of the hub cap from the wheel.

While the cover 25 has been illustrated as resembling a five pointed star, it is to be understood that the shape or configuration of this cover can be varied as desired and preferably the cover has a highly fanciful or attractive appearance so as to insure that the complete assembly is highly esthetic or appealing. After the parts have been replaced, the cover 25 is again rotated on the pin 27 so that the pointed portions 29 cover the holes 23. If desired, the pin 26 may be omitted and friction between the cover 25 and the hub cap 18 will prevent the cover 25 from accidently moving. The pin 27 serves to secure the cover 25 to the hub cap and this pin 27 may be shrunk to the cover 25 or otherwise secured to the cover 25 and it rotates with the cover 25. When removing the hub cap from the wheel the cover 25 is rotated to uncover or line up the spaces 30 in the cover 25 with the holes 23 in the hub cap 18. The cover 25 is locked to the hub cap 18 and cannot be removed from the hub cap 18, but the cover 25 can be rotated independently of the hub cap 18. The outer end portion 31 of the pin 27 may be used as a hand grip for facilitating the manual rotation of the cover 25.

Minor changes in shape, size and rearrangement of details coming within the field of invention claimed, may be resorted to in actual practice if desired.

What is claimed is:

1. In a device of the character described, a wheel including a main body portion provided with openings for the projection therethrough of studs, securing elements arranged in engagement with said studs, there being a plurality of spaced apart openings in said main body portion, an arcuate hub cap arranged contiguous to the outer surface of said wheel and said hub cap having its outer peripheral portion abutting said main body portion, a plurality of lugs each having an offset end portion secured to said hub cap, each lug further including a main straight section which terminates in an angularly disposed finger, said lugs extending through the last named openings in said main body portion and said fingers adapted to engage the inner surface of said main body portion, there being a plurality of spaced apart holes in said hub cap which are arranged in alignment with said studs, said hub cap having a plurality of indentations therein, a cover member arranged adjacent the outer surface of said hub cap, and a pin on said cover member for selectively engaging an indentation.

2. In a device of the character described, a wheel including a main body portion provided with openings for the projection therethrough of studs, securing elements arranged in engagement with said studs, there being a plurality of spaced apart openings in said main body portion, an arcuate hub cap arranged contiguous to the outer surface of said wheel and said hub cap having its outer peripheral portion abutting said main body portion, a plurality of lugs each having an offset end portion secured to said hub cap, each lug further including a main straight section which terminates in an angularly disposed finger, said lugs extending through the last named openings in said main body portion and said fingers adapted to engage the inner surface of said main body portion, there being a plurality of spaced apart holes in said hub cap which are arranged in alignment with said studs, said hub cap having a plurality of indentations therein, a cover member arranged adjacent the outer surface of said hub cap, and a pin on said cover member for selectively engaging an indentation, said lugs being made of resilient material.

3. In a device of the character described, a wheel including a main body portion provided with openings for the projection therethrough of studs, securing elements arranged in engagement with said studs, there being a plurality of spaced apart openings in said main body portion, an arcuate hub cap arranged contiguous to the outer surface of said wheel and said hub cap having its outer peripheral portion abutting said main body portion, a plurality of lugs each having an offset end portion secured to said hub cap, each lug further including a main straight section which terminates in an angularly disposed finger, said lugs extending through the last named openings in said main body portion and said fingers adapted to engage the inner surface of said main body portion, there being a plurality of spaced apart holes in said hub cap which are arranged in alignment with said studs, said hub cap having a plurality of indentations therein, a cover member arranged adjacent the outer surface of said hub cap, and a pin on said cover member for selectively engaging an indentation, said lugs being made of resilient material, said fingers being disposed outwardly of the lugs so that centrifugal force will have a tendency to hold the lugs firmly to the wheel.

4. In a device of the character described, a wheel including a main body portion provided with openings for the projection therethrough of studs, securing elements arranged in engagement with said studs, there being a plurality of spaced apart openings in said main body portion, an arcuate hub cap arranged contiguous to the outer surface of said wheel and said hub cap having its outer peripheral portion abutting said main body portion, a plurality of lugs each having an offset end portion secured to said hub cap, each lug further including a main straight section which terminates in an angularly disposed finger, said lugs extending through the last named openings in said main body portion and said fingers adapted to engage the inner surface of said main body portion, there being a plurality of spaced apart holes in said hub cap which are arranged in alignment with said studs, said hub cap having a plurality of indentations therein, a cover member arranged adjacent the outer surface of said hub cap, and a pin on said cover member for selectively engaging an indentation, said lugs being made of resilient material, said fingers being disposed outwardly of the lugs so that centrifugal force will have a tendency to hold the lugs firmly to the wheel, said cover member having a fanciful configuration and being shaped to resemble a multipointed star which has pointed end portions that define spaces therebetween, a pin member rotatably connecting said cover member to said hub cap, whereby the cover member can be positioned so that the pointed end portion or the spaces therebetween are in registry with the holes and the hub cap.

References Cited in the file of this patent

UNITED STATES PATENTS

| | | |
|---|---|---|
| 1,817,194 | Hunt | Aug. 4, 1931 |
| 2,014,058 | Tonai | Sept. 10, 1935 |
| 2,174,087 | Horn | Sept. 26, 1939 |
| 2,551,327 | Horn | May 1, 1951 |
| 2,754,154 | Solow | July 10, 1956 |

FOREIGN PATENTS

| | | |
|---|---|---|
| 303,947 | Great Britain | Jan. 17, 1929 |